Patented Mar. 13, 1934

1,951,302

UNITED STATES PATENT OFFICE 1,951,302

LEVO-COMPOUNDS OF THE 1-HYDROXY-PHENYL-2-AMINOPROPAN-1-OL SERIES AND PROCESS OF PREPARING THEM

Max Bockmühl, Gustav Ehrhart, and Leonhard Stein, Frankfort-on-the-Main, Germany, assignors to Winthrop Chemical Company, Inc., New York, N. Y., a corporation of New York No Drawing. Application September 4, 1931, Serial No. 561,301. In Germany September 8, 1930

9 Claims. (Cl. 260—128.5)

The present invention relates to levo-compounds of the 1-hydroxyphenyl-2-aminopropan-1-ol series, more particularly to compounds of the following general formula

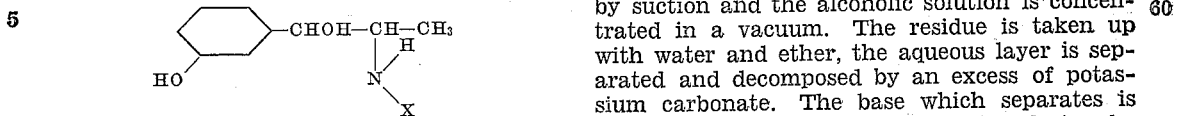

wherein X stands for hydrogen or methyl, and to a process of preparing them.

We have found that optically active compounds of the above constitution are obtained by catalytically reducing optically active 1-meta-hydroxyphenyl-2-keto-propan-1-ol in the presence of ammonia or primary amines. When using ammonia or aralkyl amines compounds with primary amino-groups are obtained, whereas when using alkylamines the corresponding alkyl-amino-compounds are obtained. The reaction is preferably carried out in an alcoholic solution. Ammonia and the primary amines may be used as free bases or in the form of their salts, e. g. the hydrochlorides of the bases may be used. As catalysts precious metal catalysts or catalysts of the nickel group may be applied. By reducing, for instance, with hydrogen and precious metal catalysts, it has proved to be advantageous to use the ammonia or the amines in the form of the free bases. When carrying out the process with catalysts of the nickel group, the bases are preferably used in the form of their salts.

The following examples serve to illustrate the invention, but they are not intended to limit it thereto.

(1) 8.0 grams of levo-meta-hydroxyphenyl-acetylcarbinol are dissolved in 7.5 grams of an alcoholic methylamine solution of 20 per cent. strength, the solution is diluted with 50 cc. of absolute alcohol and hydrogenated with palladium and hydrogen. After the calculated quantity of hydrogen has been absorbed, the catalyst is filtered by suction and the excess of alcohol is eliminated in a vacuum. The residue is neutralized by means of alcoholic hydrochloric acid, whereupon the hydrochloride crystallizes after a short time. The levo-1-meta-hydroxyphenyl-2-methylaminopropan-1-ol hydrochloride is recrystallized from methanol while adding ether. The compound melts at 215° C.–216° C. It has a specific rotation of $$[\alpha]_D^{20} = -26.7°$$

(2) 24.9 grams of levo-meta-hydroxyphenyl-acetylcarbinol and 10.1 grams of methylamine hydrochloride are dissolved in 200 cc. of absolute alcohol and hydrogenated at about 70° C. with a nickel catalyst and hydrogen. After hydrogen has been absorbed, the catalyst is filtered by suction and the alcoholic solution is concentrated in a vacuum. The residue is taken up with water and ether, the aqueous layer is separated and decomposed by an excess of potassium carbonate. The base which separates is shaken with acetic ester and, after drying by means of sodium sulfate the solution is evaporated in a vacuum. The residue obtained is absorbed in a small quantity of alcohol and mixed with alcoholic hydrochloric acid until the reaction is acid to Congo paper. After a short time, the levo-1-meta-hydroxyphenyl-2-methylaminopropan-1-ol-hydrochloride crystallizes out on cooling, which, when crystallized from absolute alcohol, melts at 215° C.–216° C. It has a specific rotation of $$[\alpha]_D^{20} = -26.7°$$

(3) 33 grams of levo-meta-hydroxyphenyl-acetylcarbinol, 23 grams of benzylamine and 250 cc. of alcohol are catalytically hydrogenated at room temperature with palladium. As soon as the absorption of hydrogen has ceased, the catalyst is filtered by suction and the alcohol is eliminated in a vacuum. The residue is taken with water and the water-insoluble portions are extracted with ether. The aqueous extract is acidified with hydrochloric acid and evaporated to dryness in a vacuum. The levo-1-meta-hydroxyphenyl-2-aminopropan-1-ol hydrochloride, which only difficultly crystallizes out, has a specific rotation of $$[\alpha]_D^{20} = -25°$$

(4) 16.6 grams of levo-meta-hydroxyphenyl-acetylcarbinol are dissolved in 200 cc. of alcohol and, after addition of 20 grams of alcoholic ammonia of 17% strength, hydrogenated with palladium and hydrogen. After the absorption of hydrogen is complete, the catalyst is filtered by suction and the filtrate is concentrated in a vacuum. The residue is taken up in a small quantity of ethyl acetate, neutralized with alcoholic hydrochloric acid and the hydrochloride formed is precipitated with ether. The levo-1-meta-hydroxyphenyl-2-aminopropan-1-ol, which only difficultly crystallizes out, has a specific rotation of $$[\alpha]_D^{20} = -25°$$

We claim:
1. The process of preparing levo-compounds of the 1-hydroxyphenyl-2-aminopropan-1-ol series, which consists in reducing levo-1-meta-hydroxyphenyl-2-keto-propan-1-ol in the presence of a compound of the group consisting of compounds of the following general formula

NH₂.X wherein X stands for hydrogen, methyl or benzyl and of hydrochlorides of these compounds by means of hydrogen and a hydrogenation catalyst.

2. The process of preparing levo-compounds of the 1-hydroxyphenyl-2-aminopropan-1-ol series, which consists in reducing levo-1-meta-hydroxyphenyl-2-keto-propan-1-ol in the presence of a compound of the following general formula

NH₂.X wherein X stands for hydrogen, methyl or benzyl, by means of hydrogen and a precious metal catalyst.

3. The process of preparing levo-compounds of the 1-hydroxyphenyl-2-aminopropan-1-ol series, which consists in reducing levo-1-meta-hydroxyphenyl-2-keto-propan-1-ol in the presence of the hydrochloride of a compound of the following general formula

NH₂.X wherein X stands for hydrogen, methyl or benzyl by means of hydrogen and a catalyst of the nickel group.

4. The process of preparing levo-1-meta-hydroxyphenyl-2-methylaminopropan-1-ol, which consists in reducing levo-1-meta-hydroxyphenyl-2-ketopropan-1-ol in an alcoholic solution in the presence of methylamine by means of hydrogen and a palladium catalyst.

5. The process of preparing levo-1-meta-hydroxyphenyl-2-aminopropan-1-ol, which consists in reducing levo-1-meta-hydroxyphenyl-2-ketopropan-1-ol in an alcoholic solution in the presence of benzylamine by means of hydrogen and a palladium catalyst.

6. The process of preparing levo-1-meta-hydroxyphenyl-2-methylaminopropan-1-ol, which consists in reducing levo-1-meta-hydroxyphenyl-2-ketopropan-1-ol in an alcoholic solution in the presence of methylamine-hydrochloride by means of hydrogen and nickel as catalyst.

7. The levo-compounds of the following general formula

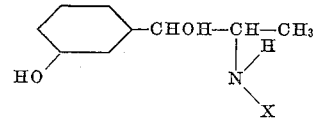

wherein X stands for hydrogen or methyl.

8. The levo-compound of the following general formula

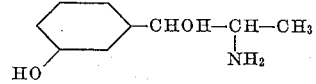

forming a difficultly crystallizing hydrochloride which has a specific rotation of $$[\alpha]_D^{20} = -25°$$

9. The levo-compound of the following general formula

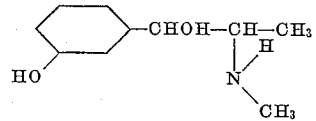

forming a hydrochloride which melts at 215° C.–216° C. and which has a specific rotation of $$[\alpha]_D^{20} = -26.7°$$

MAX BOCKMÜHL.
GUSTAV EHRHART.
LEONHARD STEIN.